United States Patent
Spurlock et al.

(10) Patent No.: US 10,999,290 B2
(45) Date of Patent: *May 4, 2021

(54) DYNAMIC AUTHORIZATION CONTROL SYSTEM AND METHOD

(71) Applicant: Cobalt Iron, Inc., Lawrence, KS (US)

(72) Inventors: Richard Raymond Spurlock, Lawrence, KS (US); Robert Merrill Marett, Lawrence, KS (US)

(73) Assignee: Cobalt Iron, Inc., Lawrence, KS (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/265,342

(22) Filed: Feb. 1, 2019

(65) Prior Publication Data
US 2020/0076819 A1 Mar. 5, 2020

Related U.S. Application Data

(60) Provisional application No. 62/723,605, filed on Aug. 28, 2018.

(51) Int. Cl.
*H04L 29/06* (2006.01)

(52) U.S. Cl.
CPC ........ *H04L 63/105* (2013.01); *H04L 63/1416* (2013.01)

(58) Field of Classification Search
CPC .......................... H04L 63/105; H04L 63/1416
See application file for complete search history.

(56) References Cited

U.S. PATENT DOCUMENTS

| | | | | |
|---|---|---|---|---|
| 8,024,225 B1* | 9/2011 | Sirota | ..................... | G06Q 30/06 705/26.1 |
| 2003/0046550 A1* | 3/2003 | Carroll | .................. | H04L 63/102 713/185 |
| 2008/0319999 A1* | 12/2008 | Simpson | ................. | H04L 63/10 |
| 2009/0048894 A1* | 2/2009 | Simpson | ................ | G06Q 10/06 705/7.22 |
| 2014/0196103 A1* | 7/2014 | Chari | .................... | H04L 63/102 726/1 |
| 2014/0208419 A1* | 7/2014 | Chang | ..................... | G06F 21/31 726/21 |
| 2017/0295197 A1* | 10/2017 | Parimi | ................ | H04L 63/1433 |
| 2018/0084010 A1* | 3/2018 | Joseph | .................... | H04L 63/20 |

FOREIGN PATENT DOCUMENTS

WO WO 2018/103595 A1 6/2018

OTHER PUBLICATIONS

Argento et al., "Towards Adaptive Access Control", Jul. 10, 2018, International Conference on Computer Analysis of Images and Patterns, Springer, Berlin, Heidelberg, Springer International Publishing AG, 11 pages.
Extended European Search Report, Application No. 19164162.0, dated Oct. 15, 2019, 9 Pages.

* cited by examiner

*Primary Examiner* — Shin-Hon (Eric) Chen
(74) *Attorney, Agent, or Firm* — Polsinelli PC; Kory D. Christensen

(57) ABSTRACT

A system includes at least one processor to continually monitor at least one resource associated with a computing network for a condition in the computing network that may trigger an authorization control modification, determine that the condition has occurred in the computing network, and dynamically and automatically modify a user authorization control for at least one particular user responsive to the condition.

24 Claims, 8 Drawing Sheets

DYNAMIC AUTHORIZATION CONTROL SYSTEM AND METHOD

CROSS-REFERENCE TO RELATED APPLICATIONS

This application is related to and claims priority under 35 U.S.C. § 119(e) to U.S. Patent Application No. 62/723,605, filed Aug. 28, 2018, entitled "Dynamic Authorization Control System and Method," the entire contents of which are incorporated herein by reference.

BACKGROUND

Role Based Access Control (RBAC), or role-based security and authorization control, is used to restrict access to systems, applications, data, operations, etc. Roles or personas are defined for various job capacities. The roles are permitted certain security access and control authorizations (permissions) to various computing resources and operations (domains of control). Individuals and entities may be assigned to one or more roles to perform various duties in an organization in a secure manner. Existing solutions have many limitations. Currently, a user can be assigned multiple roles and there may be role hierarchies that may allow inheritance of higher level roles.

However, existing solutions are typically only two dimensional RBAC implementations. A user is assigned a role that defines a set of functional permissions/authorizations and the user has a domain or a set of resources for which that role applies. If a user has multiple roles, the system may determine that the user takes the highest privilege amongst the multiple roles when the user receives permission for an action against a specific resource. Additional flexibility may be left to manual changes by an administrator.

Current solutions may statically define role assignments. Once assigned, roles and associated permissions may be left in place for long periods of time, such as years, without further validation or adjustment of the roles or permissions. As job responsibilities and business needs change, the roles become stale and permission assignments may result in security exposures in the associated network and computing environments. Identifying a stale permission assignment is a significant challenge and difficult using conventional techniques. Also, security and compliance audits to meet Information Technology Infrastructure Library (ITIL) and National Institute of Standards and Technology (NIST) and other standards' process requirements may be extremely difficult and time consuming because of these challenges.

Further, current solutions do not address security challenges associated with cloud computing environments. Authentication and access control semantics for cloud computing environments are different than for traditional information technology (IT) enterprise environments. As an example, in AMAZON Identity and Access Management, permission levels are assigned to the functions and features associated with cloud services whereas with MICROSOFT Active Directory, permission levels are assigned as Security Identifiers (SIDs) to Security Principals (users or groups) or objects. In addition, authentication and access control semantics differ across different cloud service providers. These different and mismatching authentication and access control semantics are a growing challenge for businesses leaving security exposures in their administrative operations.

IT and data environments are rapidly changing. As an example, many IT solutions may involve a plurality of differing cloud computing solutions provided by multiple providers. In addition, security requirements are also rapidly changing.

It is with these issues in mind, among others, that various aspects of the disclosure were conceived.

SUMMARY

According to one aspect, a dynamic authorization control system and method is provided for dynamic, multi-dimensional authorization control techniques that are responsive to changes, conditions, or events in an environment and that may improve over time, based on machine learning. A system may include at least one processor to continually monitor at least one resource associated with a computing network for a condition in the computing network that may trigger an authorization control modification, the condition comprising one of an active project that uses the at least one resource, a security alert level change, a resource locality change, metadata associated with the condition, a skill assessment, and a business state analysis, determine that the condition has occurred in the computing network, and dynamically and automatically modify a user authorization control for at least one particular user responsive to the condition.

According to another aspect, a method includes continually monitoring, by at least one processor, at least one resource associated with a computing network for a condition in the computing network that may trigger an authorization control modification, the condition comprising one of an active project that uses the at least one resource, a security alert level change, a resource locality change, metadata associated with the condition, a skill assessment, and a business state analysis, determining, by the at least one processor, that the condition has occurred in the computing network, and dynamically and automatically modifying, by the at least one processor, a user authorization control for at least one particular user responsive to the condition.

According to an additional aspect, a non-transitory computer-readable storage medium includes instructions stored thereon that, when executed by a computing device cause the computing device to perform operations, the operations including continually monitoring at least one resource associated with a computing network for a condition in the computing network that may trigger an authorization control modification, the condition comprising one of an active project that uses the at least one resource, a security alert level change, a resource locality change, metadata associated with the condition, a skill assessment, and a business state analysis, determining that the condition has occurred in the computing network, and dynamically and automatically modifying a user authorization control for at least one particular user responsive to the condition.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
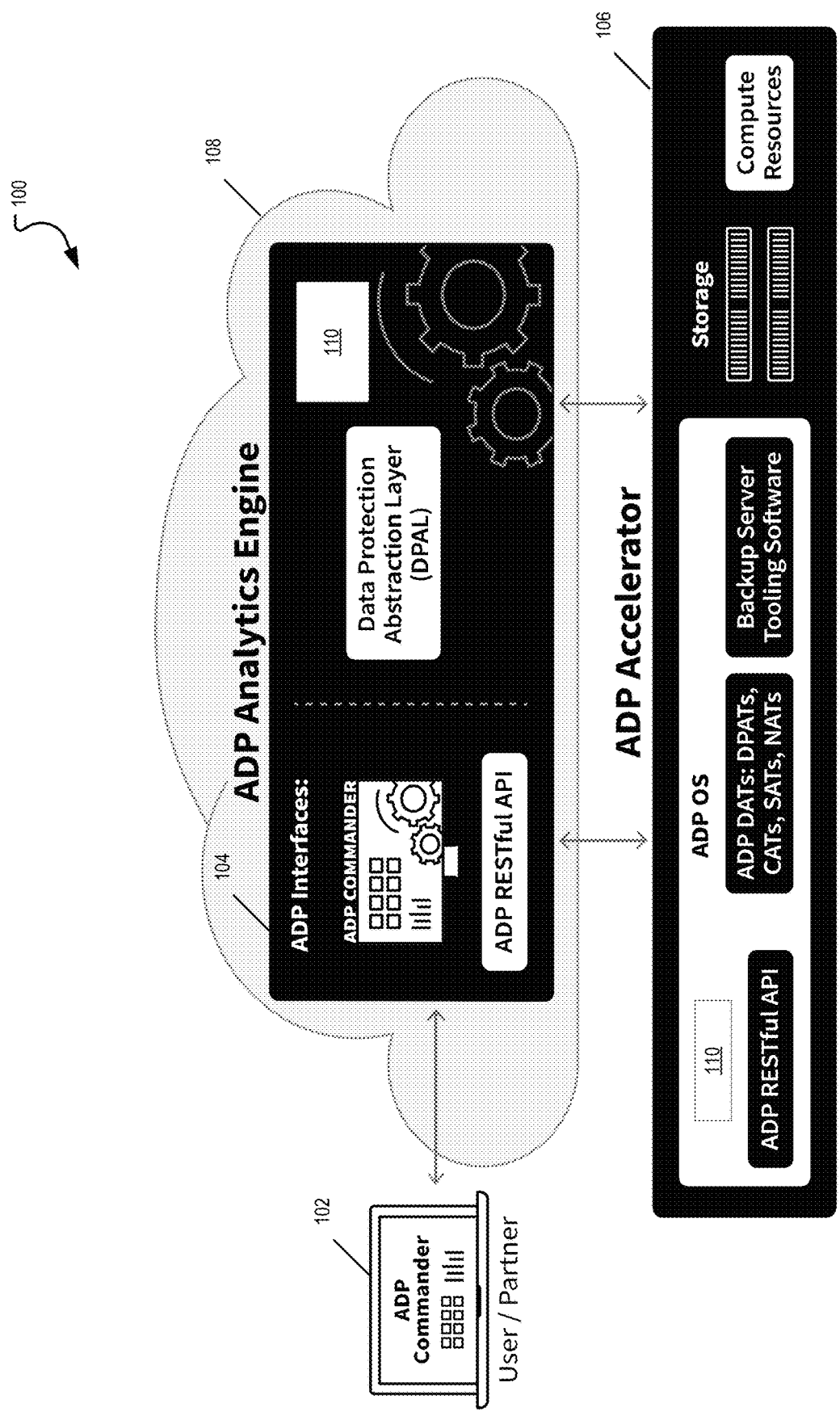
FIG. 1 is a block diagram of a dynamic authorization control system and method according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing devices and the server computing devices communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML. Aspects of a system and method for dynamic authorization control may include a dynamic authorization control application that provides flexibility in authorization control schemes that are not currently available in conventional solutions. The system may provide multi-dimensional, multi-layered authorization roles and transient/temporary roles.

In addition, the system may provide analytics including machine-learning based analytics that allow for automatic adjustment of authorization control (including authentication and access control privileges) based on various conditions, changes, and events that may occur in the system. In addition, the system provides solutions to problems associated with emerging multi-cloud computing systems and environments. Conditions, changes, and events that may occur in the system may include a cyber threat (e.g., a ransomware attack, a malware attack, a security alert from a business security alert system, a terror attack, and others), the health status of a computing device or an information technology (IT) operation (e.g., offline, online, in-progress, failed, failing, etc.), a failure or a pending failure of a computing device or IT operation, a capacity or performance or other metric or a dramatic change in a metric of a computing device or an IT operation (e.g., a network or storage or server utilization rate, a network or storage capacity, a data throughput rate, an I/O rate, etc.), an event in the environment (e.g., a fire, a security breach, a backup job completion or failure, other event in backup server tooling software, a database failure, a business audit, etc.), an event outside of but associated with the environment (e.g., a weather event, a government alert, etc.), an operational state and status of a business project (e.g., an audit, a technology deployment project, an active business project, completion of a business project state, etc.), a job or responsibility change, a security alert level, a status of an environmental monitor (e.g., a temperature, an electrical power level, a power outage, a humidity level, etc.), a result of a skills assessment, a status of a cloud computing service, an utilization of a cloud computing service, a location of an application or data or other computing resource, other security event (e.g., an access attempt to an application, data, or other resource), active status of roles, identifiers (IDs), and users, and others. Conditions, changes, and events are terms that may be used interchangeably and may be referred to, collectively or individually, as conditions.

The present disclosure relates generally to authorization control techniques and, more particularly, to dynamic, multi-dimensional authorization control techniques that are responsive to changes or events in the environment and that improve or are optimized over time based on machine learning.

Authorization controls are the processes by which individuals or entities are validated to have proper security authentication (e.g., identity verification) and access control (e.g., permissions/privileges) to execute some action (e.g., access, view, edit, move, write, delete, topology rendering, configure, etc.) against some resource (e.g., a building, a bank account, an application, data, a computing resource, an IT resource, an operation center, a public cloud service, etc.).

While role-based management control and authorization techniques are very prevalent, they are lacking in flexibility and relevance to constantly-changing environments. They are typically two dimensional in nature providing control over 1) functional permissions and 2) domain, or scope, of those permissions. IT administrators may have many roles some of which are transient in nature and some of which may be partially or completely overlapping or even conflicting. In addition, roles may change in different environments (e.g., in different cloud computing environments or platforms, data centers, or projects). None of these approaches are responsive to cyber threats (e.g., ransomware attacks, security alerts from business security alert systems, terror attacks, and others) or other conditions in the system that have been described herein. These and other situations are authorization control challenges for which there are currently no good solutions in the industry.

FIG. 1 shows a block diagram of a computing system that includes a dynamic authorization control system 100 according to an example embodiment. The dynamic authorization control system 100 includes at least one client computing device 102 that is in communication with at least one Adaptive Data Protection (ADP) analytics engine server computing device 104 (hereinafter ADP analytics server computing device) and at least one ADP accelerator server computing device 106 via a communications network 108.

According to an exemplary embodiment, the dynamic authorization control system 100 may include one logical instance of the ADP analytics server computing device 104, a plurality of client computing devices 102, and a plurality of ADP accelerator server computing devices 106, among other computing devices. Each entity, company, organization, corporation, etc. may have its own particular ADP accelerator server computing device 106 that communicates with the ADP analytics server computing device 104. Each ADP accelerator server computing device 106 may be implemented based on particular workloads, computing architecture, network architecture, and a cloud computing network deployment for that particular entity.

In one embodiment, the ADP analytics server computing device 104 may include a plurality of hardware and software modules that may perform various functions. The ADP analytics server computing device 104 may receive metadata exhaust from each ADP accelerator server computing device 106 of the system 100 and may push information and messages to the ADP accelerator server computing device 106 such as software upgrades, configuration instructions, policies, operational commands, security controls, etc. In addition, the ADP analytics server computing device 104 may store and process information associated with analytical intelligence, automation, authentication control, and best practice capabilities within its modules that may optimize ADP accelerator server computing device 106 operations.

The ADP analytics server computing device 104 may include a data protection abstraction layer (DPAL) that may interact with ADP data acquisition tools (DATs) and may handle data protection, cloud computing, storage, and network products and services, enabling the data protection, cloud computing, storage, and network products and services in a consistent manner in the system 100. The ADP analytics server computing device 104 may provide an ADP commander user interface and a RESTful application programming interface (API). In an example embodiment, the ADP analytics server computing device 104 may provide capabilities and services that may be delivered as a service from at least one global cloud computing provider.

The ADP accelerator server computing device 106 may include compute resources (e.g., hardware servers, virtual servers (e.g., VMWARE virtual machines), and various cloud compute resources (e.g., virtual, bare metal, or hosted systems). A bare metal virtualization may include running a virtual operating system using a hypervisor. A hosted system may run a virtual operating system using virtual hardware on a host operating system which uses physical hardware. The compute resource may include memory (e.g., RAM and/or ROM), network interfaces, management interfaces, storage area network (SAN) interfaces, and other resources.

The ADP accelerator server computing device 106 may include an ADP operating system (ADP OS) that provides management, monitoring, reporting, alerting, authentication control, integration, orchestration, ADP analytics exhaust management, and other modules and services that may monitor and control data protection operations that may be monitored by the ADP accelerator server computing device 106 for the system 100. The ADP OS may provide environmental monitoring including the measuring of temperature, power, security alert levels, and other variables associated with the system 100 and its associated network, cloud computing system, and other computing systems and environments.

The ADP OS may provide ADP data acquisition tools (ADP DATs). The ADP DATs may manage, monitor, and control a variety of data protection, cloud computing, storage, and network products and services. ADP DATs may include a data protection acquisition tool (DPAT), cloud acquisition tool (CAT), storage acquisition tool (SAT), and a network acquisition tool (NAT).

Further, the ADP OS may include and manage backup server tooling software. This may include a set of backup vendor software products (e.g., IBM SPECTRUM PROTECT™, VERITAS NETBACKUP™, VEEAM, etc.), cloud backup services, server or storage snapshot utilities, application backup tools, or other backup or replication utilities that may execute many backup, restore, and long term data retention operations on data in the system 100 and its associated network, cloud computing system, and other computing systems and environments. In addition to backup server tooling software, the ADP OS may also include and manage operating system software associated with computing devices in the system 100, file systems associated computing devices of the system 100, and other software resources associated with the system 100.

In short, the ADP OS may interact with the ADP analytics server computing device 104 to manage and automate data protection operations of the system 100.

Storage of the system 100 may include backups of system user data that may be stored where the user desires, e.g., on local storage computing devices and on cloud storage, among other locations. Storage may be physically included in the ADP accelerator server computing device 106 and/or may be separate such as external storage arrays and/or stored on cloud-based storage. However, the storage may appear to a user as being logically attached to the ADP accelerator server computing device 106 and may be used by ADP accelerator server computing device 106 services.

According to an example embodiment, the ADP accelerator server computing device 106 may be deployed on client premises, in a data center, in a remote office, in a private cloud computing environment, in a public cloud computing environment, and in a third-party hosting/data center, among other locations. The ADP accelerator server computing device 106 may be deployed as a virtual appliance in a virtual environment (e.g., a virtual machine in VMWARE or in VMWARE® Cloud), as a physical appliance, or in a public cloud computing environment (on virtual, bare metal, or hosted systems). In order to provide greater degrees of data security and availability, the ADP accelerator server computing device 106 may be configured to create additional copies of data via services such as data replication and data copies to various media types or storage classes.

In one embodiment, the ADP accelerator server computing device 106 may be considered an ADP conduit. An ADP conduit may provide industry services such as ticketing, orchestration, service management, and other solutions. An ADP conduit may be deployed to implement special security access controls that may be requested for various customer environments.

The ADP accelerator server computing device 106 may operate autonomously from the ADP analytics server computing device 104 but also may be integrated with the ADP analytics server computing device 104. The ADP accelerator server computing device 106 may share metadata exhaust data with the ADP analytics server computing device 104 and may in return receive analytics-derived guidance in order to optimize data protection operations for the system 100. In addition, operating system software, ADP OS software, backup server tooling software, device firmware/microcode, and other software may be transmitted from the ADP analytics server computing device 104 to the ADP accelerator server computing device 106.

The system 100 may include adaptive data protection interfaces including a graphical user interface (GUI) and a RESTful API as discussed above. The system 100 provides ADP Commander, a GUI that comprises a dashboard portal that graphically provides information regarding the system 100. The ADP Commander may be presented from the perspective, view, and authentication permissions of each user of the system 100. In addition, an administrator of the system 100 may access the portal to view the status for each user/partner associated with the system 100. The administrator may resolve issues, execute ADP accelerator server computing device 106 deployments, and may view analytics regarding the system 100 or individual customer domains. Services and solutions of the dynamic authorization control system 100 may be shared amongst and delivered through multiple partners (e.g., separate companies and organizations and sub-organizations of companies) to multiple sets of clients and customers. A partner of the system 100 may view a particular portion of the system environment from the perspective, view, and authentication permissions of the partner. A partner may view partner customer environments. End users of the system 100 may view a portion of the system 100 from the perspective, view, and authentication permissions of the user. A customer may view ADP accelerator server computing device information and computing devices that may be associated with the ADP accelerator server computing device 106.

The ADP Commander user interface may provide complete multi-tenancy functions/features at different levels (e.g., partners, users) and may provide comprehensive reporting, monitoring, authentication control, security, chargeback, showback, provisioning of client computing devices, policy management, capacity management, management of system inventories, and others at all levels.

In addition, the RESTful API provides ADP functionality and all ADP functions may be accessed and managed using the RESTful API.

The ADP analytics server computing device 104 may have some components of a dynamic authorization control application 110 and the ADP accelerator server computing device 106 may have other components of the dynamic authorization control application 110 that communicate with storage that may include at least one database that comprises a non-relational database and/or a relational database for storing user information, among other data. As an example, the information may be stored in a relational database management system (RDBMS), an open source distributed database management system such as a Not only SQL (NoSQL) database management system, an in-memory database (IMDB) management system, or another appropriate database management system. As an example, each user associated with the system 100 may have associated information stored in the database such as an identifier associated with the user and a role associated with the user that may be dynamically modified by the system 100.

The client computing device 102 may include a display and an input device. The display is used to display visual components of the dynamic authorization control application 110, such as at a user interface, e.g., ADP Commander. In one example, the user interface may display a user interface of the dynamic authorization control application 110, and a representation of the requested resources received from the ADP analytics server computing device 104. The display can include a cathode-ray tube display, a liquid-crystal display, a light-emitting diode display, a touch screen display, and/or other displays. The input device is used to interact with the dynamic authorization control application 110 or otherwise provide inputs to the client computing device 102 and may include a mouse, a keyboard, a trackpad, and/or the like. The input device may be included within the display if the display is a touch screen display. The input device allows a user of the client computing device 102 to manipulate the user interface of the dynamic authorization control application 110 or otherwise provide inputs to be transmitted to the ADP analytics server computing device 104.

The at least one ADP analytics server computing device 104 is configured to receive data from and/or transmit data to the at least one client computing device 102 through the communications network 108. Although the at least one ADP analytics server computing device 104 is shown as a single server, it is contemplated that the at least one server computing device 104 may include multiple servers, for example, in a cloud computing configuration.

The one or more computing devices communicate and coordinate their actions by passing messages over the communications network 108. The communications network 108 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the dynamic authorization control system 100 may be a cloud-based computer system or a distributed computer system that may include one or more cloud-based computer systems including AMAZON WEB SERVICES, VMWARE CLOUD, MICROSOFT AZURE, IBM CLOUD, GOOGLE CLOUD PLATFORM, ALIBABA CLOUD, and other cloud computing services.

The dynamic authorization control application 110 may be a component of an application and/or service executable by the client computing device 102 and/or the ADP analytics server computing device 104 and/or the ADP accelerator server computing device 106. For example, the dynamic authorization control application 110 may be a single unit of deployable executable code or a plurality of units of deployable executable code. According to one aspect, the dynamic authorization control application 110 may be a web application, a native application, and/or a mobile application (e.g., an app) downloaded from a digital distribution application platform that allows users to browse and download applications developed with mobile software development kits (SDKs) including the App Store and GOOGLE PLAY®, among others. The dynamic authorization control application 110 may be installed on the client computing device 102, which may have a WINDOWS operating system, APPLE MACOS operating system, a Linux operating system, the iOS operating system or an ANDROID™ operating system, among other operating systems. In an exemplary embodiment, the dynamic authorization control application 110 may include a first client component executed by the client computing device 102 and a second server component executed by the at least one ADP analytics server computing device 104 and/or the ADP accelerator server computing device 106.

The dynamic authorization control application 110 may provide multiple dimensions of authorization control. Correlation and analysis of various factors in the system 100 and its associated network, cloud computing system, and other computing systems and environments may be used to dynamically adapt authorization privileges (e.g., roles and permissions). The correlation and analysis may result in additional layers or dimensions of authorization control management that may be added dynamically to authorization control permission processing. The additional layers or dimensions of authorization control management may include correlation and analysis of active status of roles, identifiers (IDs) and users, users associated with active business projects or teams, system and environment status information (e.g., changing security alert levels), locality of an application (e.g., where is hardware physically located that executes an application and where are computer-readable executable instructions stored), data, or computing resource associated with the system 100, business state analysis derived from business systems of record, business guidance, business objectives, and other business metadata input, skills level assessments, changing job responsibilities, and other conditions in the system 100 and its associated network, cloud computing system, and other computing systems and environments.

Traditional static permissions (e.g., authentication roles, domains, tasks) fall short of the enhanced authorization control management discussed herein. Traditional static permissions may include checking user credentials for functional (roles and tasks) and domain privileges to determine if a user is allowed to perform a particular function or task against specific applications, data, or computing resources.

In one example, the dynamic authorization control application 110 may provide automated validation of authorization privileges with respect to active status and active projects. One security exposure often found in computing environments includes stale or inactive authorization privileges. Privileges may be assigned to IDs, roles, and others, and are never updated or revisited. Changes in job responsibilities, employers, applications, business objectives, business projects, and others may not be adequately and appropriately reflected in authentication privileges. The dynamic authorization control application 110 provides for automated reviews, validations, and cleanups of authentication privileges.

Roles, IDs, and others may be regularly monitored for authorization activity using audit logs, security logs, authorization directories, and others. An administrator of the system 100 may specify a time period of authorization inactivity and one or more steps for the system 100 to take after the time period is exceeded. For example, an administrator of a database application associated with the system 100 who has not accessed the database for a time period may have privileges demoted or removed. Demoted or lost authorization privileges may be reinstated for the role or ID associated with the administrator if a need is determined to be valid. Thus, the dynamic authorization control application 110 may automatically remove inactive and/or stale permission assignments.

In an example, the dynamic authorization control application 110 may regularly monitor authorization activity and validation of authorization may occur on a regular, scheduled basis for one or more roles or one or more IDs associated with the system 100. Alternatively, the dynamic authorization control application 110 may monitor each new authorization request in the system 100. Both options are possible.

In addition, the dynamic authorization control application 110 may analyze authorization attempts based on an association with an active, funded business project or team. The dynamic authorization control application 110 may allow a business or a client to validate an authorization request against funded business projects or teams. A ledger or database of business projects and teams may be stored and may be analyzed to identify active, funded business projects and teams. In addition, business project management systems may be analyzed by the dynamic authorization control application 110 to identify task assignments for individuals or groups. Roles or IDs may be associated with active, funded business projects or teams. Thus, authorization requests from roles or IDs may be validated against active, funded business projects or teams to determine if authorization privileges for a requested task may be granted.

The dynamic authorization control application 110 may also dynamically adjust authorization privileges based on active business projects or teams. As an example, a user requesting permission to perform a task may be dynamically validated against a dynamically changing list of priority projects and teams associated with the business to determine if normal privileges have been increased or reduced based on various project activities.

Conventionally, a user may receive improper escalation of privileges. For example, a technology deployment or data center migration project may require that an administrator receive additional permissions for a duration of the deployment or migration project. Conventional solutions typically allow the administrator to receive superuser privileges. However, this may lead to an inappropriate granting of excessive privileges and the permissions may be granted longer than needed or intended.

In another example, an individual may move from one team or another team or may move from one job to another job. In these cases, the individual should immediately have authorization privileges changed as warranted. The dynamic authorization control application 110 provides these solutions and allows timely dynamic modification of authorization control based on team changes or job changes.

Business projects or teams associated with a data center migration, technology deployment, IT service restructuring, disaster recovery testing, or auditing, may in certain instances need additional transient or temporary privileges for a particular user, which may override a user's normal privileges and allow permission. For example, a data center migration team member or an audit team member may receive increased, promoted privileges during a data center migration or audit to perform functions using particular software applications associated with the system 100, data, or computing resources associated with the system 100 that the user may not normally be allowed to perform.

Alternatively, certain business projects or teams may want some users to have reduced transient or temporary privileges than they normally do during a duration of a specific project. For example, during a data center migration or an IT service restructuring, application administrators may not be allowed to update applications. In another example, backup administrators may be restricted from performing certain operations during a disaster recovery test.

In a further example, the dynamic authorization control application 110 may allow for different operational states for each different active, funded business project or team. The operational states of a project may include design, prototype, validation, pre-production, production, steady-state, sunset, decommissioned, and other operational states. The operational states of the project may affect roles and permissions. Authorization privileges may be dynamically adjusted at the project state level to reflect changes in roles and permissions through the lifecycle of a project.

Roles and users to promote or demote and specific levels to promote or demote to may be identified and specified in a business defined project policy and/or in a general business security policy. The policy may include specification of projects, duration and/or a completion date of the project, operational states of the project, durations and/or completion dates of the operational states of the project, identification of roles/users to have increased (promoted) privileges during the project or project state (e.g., user A and user B), privilege level(s) to promote users to (e.g., three to four or user to admin), identification of roles/users to have decreased (demoted) privileges during the project or project state (e.g., user A and user B), and privilege level(s) to demote users to (e.g., four to three or admin to user), among others.

In a further embodiment, the dynamic authorization control application 110 may perform machine learning to determine durations of projects, duration of transient adjustments to authentication permissions, identification of roles/users to have increased (promoted) privileges during a project, identification of roles/users to have decreased (demoted) privileges during the project, privilege levels to promote/demote users to, and others. Machine learning may be based on analysis of system and resource behaviors, conditions, business guidance via metadata input, business state analysis of business systems of record, business objectives, and other factors. System and resource behaviors may include the results of previous operations under certain conditions in the environment as well as the results of previous adjustments to authorization privileges made by the dynamic authorization control application 110.

In one example, the dynamic authorization control application 110 may query the storage of the ADP accelerator server computing device 106 and/or other databases to determine information associated with active, funded business projects or teams. Alternatively, the dynamic authorization control application 110 may query a project management system computing device to determine active, funded business projects or teams and associated completion dates to determine duration of business projects or teams. Project management system computing devices and/or other computing devices may be queried to determine task assignments and dynamically determine roles/users to have promoted/demoted authorization privileges.

Privilege levels may include roles and authorization levels (e.g., system, read-only, administrator, super-user, reader, writer, editor, policy, storage, operator, read, write, execute, among others). In addition, the privilege levels also may be numerical values or alphabetical values, among others. The system 100 may allow each organization, sub-organization, teams, and projects to define local authorization control prioritizations that may drive conflict, event, or threat resolution and decisions. Organizations, sub-organizations, teams, and projects may include departments (e.g., finance, audit, development). Projects may include data center migration or technology migration, deployment, audit, and others. Teams may include business analytics, development operations (DevOps), and others.

As a security principle, people and entities may be excluded from the system 100 and its associated network, cloud computing system, and other computing systems and environments. In certain situations, when the system 100 and its associated network, cloud computing system, and other computing systems and environments are operating smoothly, the system 100 may desire to demote certain authorization levels to minimize a risk of unexpected changes. In certain situations, (e.g., when a ransomware attack occurs, heightened environment security alert levels, personnel layoffs or changes) heightened monitoring, tracking, and security controls may be provided for most users and/or roles associated with the system 100. In addition, the heightened monitoring, tracking, and security controls may result in demotion of certain authorization levels across the system 100 and its associated network, cloud computing system, and other computing systems and environments to limit access to resources in times of heightened threat.

In the event of such a heightened threat, particular trusted individuals, roles and/or entities may be assigned promotions or escalations of permissions, privileges, and domain access to help resolve any issues that may arise from the threat.

As an example, data recovery may only be allowed by a few users (e.g., backup administrators or help desk personnel). The system 100 may regularly monitor computing resources including data backups, networks, system availability, network availability, and other environmental metrics such as ambient temperature of computing resources. If a failure is determined to have occurred or may be pending, the system 100 may automatically adjust recovery privileges to allow additional users to recover data. This may greatly expedite recovery of data and may prioritize recovery based on needs.

As another example, the system 100 or other computing systems in the environment may be struggling with data ingestion issues and a trouble ticket may be automatically created. The dynamic authorization control application 110 may correlate the trouble ticket to determine how to resolve the issue, may assign a qualified individual and associated user to resolve the issue, and escalate the access privileges for the user to associated resources in the system 100 or other computing systems in the environment until the trouble ticket is resolved.

In further examples, in the event of a heightened threat, the system 100 may require identity revalidation of particular trusted individuals, roles, and/or entities. The system may request external, manual input and guidance from a special trusted individual or role on how to address the heightened threat. The input may include designation of specific individuals, roles, IDs, and/or entities that may be allowed access to resolve associated events and/or threats. The input may include levels of authorization that may be granted to users manually. A user may use the ADP Commander user interface to assign users certain levels of control based on roles.

A physical location of an application, data, or computing resource associated with the system 100 may change based on many factors. Virtual servers may be moved or relocated at any time for business purposes, economic factors, or changes in computing environments. Physical servers also may be frequently moved or migrated. As an example, a server may be located on-premises in a customer data center and may be moved to being privately hosted at a colocation facility or a hosted cloud service.

Users that may be normally allowed to have privileges to perform functions against applications, data, or computing resources that were on-premises may not be allowed to have the same privileges if the applications, data, or computing resources are located in a colocation facility or associated with a private cloud environment or public cloud environment. In addition, a user may have different privileges based on a particular cloud computing provider. Thus, in an example, a user requesting to perform a task may have particular privileges based on a locality of the application, data, or computing resources to determine whether to apply normal privileges or increase/decrease privileges.

In some computing environments, business metadata and business state analysis may be used to influence authentication and access control privileges for applications, data, and/or computing resources. Business metadata may include security policy systems, enterprise management systems, operational design requirements, business process metrics, business systems of record, business guidance, business objectives, or other business input. Business state analysis may be derived from observation, correlation, and analysis of one or more business metadata sources. The dynamic authorization control application 110 may analyze these sources of business metadata and may dynamically adjust authentication and access control privileges.

In one example, a company may be in the process of a merger and acquisition (M&A). In such a situation, the company may have particular authorization control adjustments that may be associated with different operational states in the M&A. The adjustments may be important and may be done securely and efficiently. A technical due diligence team associated with the M&A may have to have access to source code, development processes, applications, and/other business resources at specific operational states in the M&A process. The dynamic authorization control application 110 may query the business metadata sources to determine operational states of the M&A process to determine particular members of the technical due diligence team and a current status of the M&A deal. As a result, the dynamic authorization control application 110 may modify authorization control of one or more users associated with the due diligence team at an appropriate time and only at an appropriate time during the M&A deal (e.g., modify the authorization control from a first level to a second level only during this time during the M&A deal).

In addition, a user requesting permission to perform a task against specific applications, data, or computing resources during the M&A deal may be dynamically checked to determine if authorization privileges for the task may be allowed.

In certain instances, users of a system 100 and its associated network, cloud computing system, and other computing systems and environments may improve on skills and this may be determined based on skills assessments. Users with a certain skill level may be allowed access and control to certain applications, data, and/or computing resources (e.g., mission critical applications). For example, backup administrators may have to be skilled in storage, backups, and networking, among other skills. Likewise, database administrators may have to have a level of competency in certain skills. The dynamic authorization control application 110 may assess individual skills associated with computing resources and technologies to automatically assign a level of privileges. Thus, users may be provided with an appropriate amount of access and control to applications, data, and computing resources based on skill assessments.

Skill assessments may take a variety of forms including quizzes that may be presented to a user when the user first makes a request to access and/or control certain applications, data, and/or computing resources. If the user scores a particular score on the quiz or assessment, the user may be granted a particular level of access and control. The particular level of access and control may be commensurate with the score on the quiz or assessment. In other words, the user may have to have a score above a particular score to be granted a higher level.

Use of cloud computing services provides flexibility and other benefits for the system 100 and its associated network, cloud computing system, and other computing systems and environments. However, use of cloud computing services also introduces security concerns associated with authorization control management. Traditional authentication and access control privileges may not be appropriate or useful for cloud authorization privileges. However, for expediency and ease of use, enterprises may often allow roles and/or IDs certain access to cloud computing services. This may open the door to security concerns and compute inefficiencies. For example, a database administrator or a development operations (DevOps) team member that traditionally used a capital expense process to acquire new computing infrastructure may have privileges to consume a large amount of cloud resources without accountability.

A particular cloud computing provider may utilize security constructs that provide a way to represent a cloud feature and a mechanism to define/permit a level of access to the feature. This is different than traditional authorization control methodologies. As an example, a cloud provider may provide authorization enrollment for each cloud service/function. In other words, cloud authorization may require a different framework of granting access than traditional authorization controls.

In an embodiment, the system 100 may provide a cloud security profile that specifies for each cloud computing service provider associated with the system a name of the cloud computing provider, cloud regions associated with the cloud computing provider, cloud service provisioning privileges (for specific cloud features and functions and they may be specific for each cloud service provider), roles or IDs that may be allowed to use cloud services on behalf of a company/client, permissions allowed for each role or ID (e.g., cloud services a role or ID may be allowed to use), maximum cloud services costs a role or ID may be allowed to spend in a particular period of time (e.g., $100 a month), and other cloud computing provider specific characteristics.

By using the cloud security profile, the system 100 may provide cloud authentication and access control privileges that may be tracked and included based on roles and IDs. In addition, each cloud computing provider may have different authorization policies to control privileges and usage of various cloud services.

The system 100 may analyze cloud computing privileges using the cloud security profile and map the cloud computing privileges to other previously discussed constructs such as an active, funded business project or team. In addition, the system 100 may automatically monitor cloud computing service usage for each specific role or ID and may automatically adjust cloud privileges for each role or ID.

The costs and ease of consumption of cloud computing services has led many companies to leverage cloud services for many of their computing and IT resource needs. However, companies may experience out of control use of cloud services, hidden costs, and lack of discipline associated with their consumption. As a result, the costs of cloud computing services and compute inefficiencies are spiraling out of control. The authorization control limits provided by the system 100 based on the cloud security profile and cloud computing service usage solves these issues.

According to example embodiments, a duration of time associated with transient or temporary promotions or demotions of privileges may be determined based on security policies, durations of projects, security alert levels associated with the system 100 and its associated network, cloud computing system, and other computing systems and environments, organizational changes, or other events/conditions associated with the system 100 and its associated network, cloud computing system, and other computing systems and environments. In one example, the duration of time for adjustment of privileges may be associated with a project policy (e.g., a duration of a project or of a project operational state). In another example, the duration of time for adjustment of privileges may be based on a current security level in the system 100 and its associated network, cloud computing system, and other computing systems and environments (e.g., a high security alert level may potentially lead to demoted privileges for some users/IDs and/or promoted/elevated privileges for other users' IDs tasked with resolving issues associated with the high security alert for the duration of the high security alert level).

As provided herein, a duration of time associated with transient or temporary promotions/demotions of privileges may be dynamically modified based on analysis and machine learning. System security audit logs, security event system logs, application logs, and others may be analyzed to determine and observe security events that have occurred before, during, and after previous projects where privileges were promoted and/or demoted. Identification of authorization security events during and immediately after previous projects may indicate that a level of privilege was inappropriate and may have to be adjusted in the future.

The dynamic authorization control application 110 may observe, monitor, and learn from continuous operation throughout the system 100 and its associated network, cloud computing system, and other computing systems and environments. The dynamic authorization control application 110 may monitor computing resource infrastructure and component status, a status of operations, security controls applied, threats perceived and dealt with, changes indicating possible threats or compromises, permission demotions/promotions, and results of previous security demotions/promotions, among others. The system 100 may adjust authorization control based on monitoring history and external input. Adjustments may include modifying a length of time permissions that are demoted and/or promoted for particular kinds of conditions or threats, changing permission levels demoted/promoted to/from for particular kinds of conditions or threats, adjusting authentication policies, adjusting access controls, and others.

Analysis of different types of security and other conditions in the system 100 and its associated network, cloud computing system, and other computing systems and environments may result in different adjustments to role permissions, security policies, access controls, permission adjustment durations, transient permission adjustment levels (promotions, demotions), and other adjustments. Analysis may be performed based on types of security events that occur during projects, a number of security events that occur during projects, project durations, users or entities that cause security events, normal permission access activity for one or more users, computing environment security alert levels, business defined security policies, system security audit logs, security event system logs, application logs, ransomware and cyber-attack monitors, data protection activities (e.g., dramatic changes in deduplication ratios or unusual increases in backup traffic may indicate a ransomware attack), network traffic, electrical monitors, heat monitors, other environmental monitors, vacation or travel schedules of users associated with the system 100 obtained from project management systems, and others.

Analysis may include evaluation of common security events. Analysis also may include comparing types of security events (e.g., multiple failed authentications by one or more users) to normal permission access activity for the one or more users. Multiple security events detected after a project associated with one or more users trying to use their permissions may be an indication that the durations of transient permission adjustments should be modified. On the other hand, users making repeated, failed unusual permission attempts may indicate that durations of transient permission adjustments should be modified.

In another example, environment security alert levels may be based on system security logs, security event system logs, application logs, ransomware and cyber-attack monitors, data protection activity (e.g., dramatic changes in deduplication ratios or unusual increases in backup traffic may indicate a ransomware attack), and others. The detection of multiple security events within a pre-specified time period may increase an environment security alert level. If no security events are detected within another pre-specified time period, then the environment security level may be decreased.

In another example, a security alert level may indicate a disaster condition based on a fire, earthquake, flood, severe cyber-attack, terror attack, or other event. When a disaster condition occurs, an authorized, trusted individual user or role (e.g., a member of a disaster response team) may be given specific authentication permissions to certain physical buildings, or locations, or computing resources and other permissions may be restricted.

Environment security alert levels also may be set manually based on factors such as severe weather, fire, employee layoffs or turnover, known cyber-attacks, physical security breaches, and others. In one example, an authorized, trusted individual user or role may modify the environment security alert level using a client computing device 102 by providing input to the ADP Commander user interface.

Correlation and analysis may be completed for a set of computing environment security alert levels, types and numbers of security events or other indicators in the computing environment, business projects/activities, changing job responsibilities, and other conditions. Increases in security alert levels, a number and severity of security events, or other conditions may result in demoted privileges for one or more users or roles and promoted/elevated privileges provided temporarily to one or more users or roles. The assignment of promotion/demotion permissions and privileges may be defined and granted as a one-time adjustment or another type of adjustment for particular trusted individuals, roles, and/or entities to address events or threats.

The system 100 may continually perform comparisons and analysis as security alert levels change based on security events or conditions, business projects/activities, and changing job responsibilities, among other conditions. Dynamic adjustments can be made to role permissions, security policies, access controls, permission adjustment durations, and permission adjustment levels based on the comparisons and analysis.

As a result, the system 100 provides additional dimensions of authorization control management that may be automatically reflected in user privilege authorization controls providing dynamic adjustment of authorization control. The system and the dynamic authorization control application 110 may provide greater and current authorization control that lowers computing security risks and improves computing efficiencies.

Figure 2:
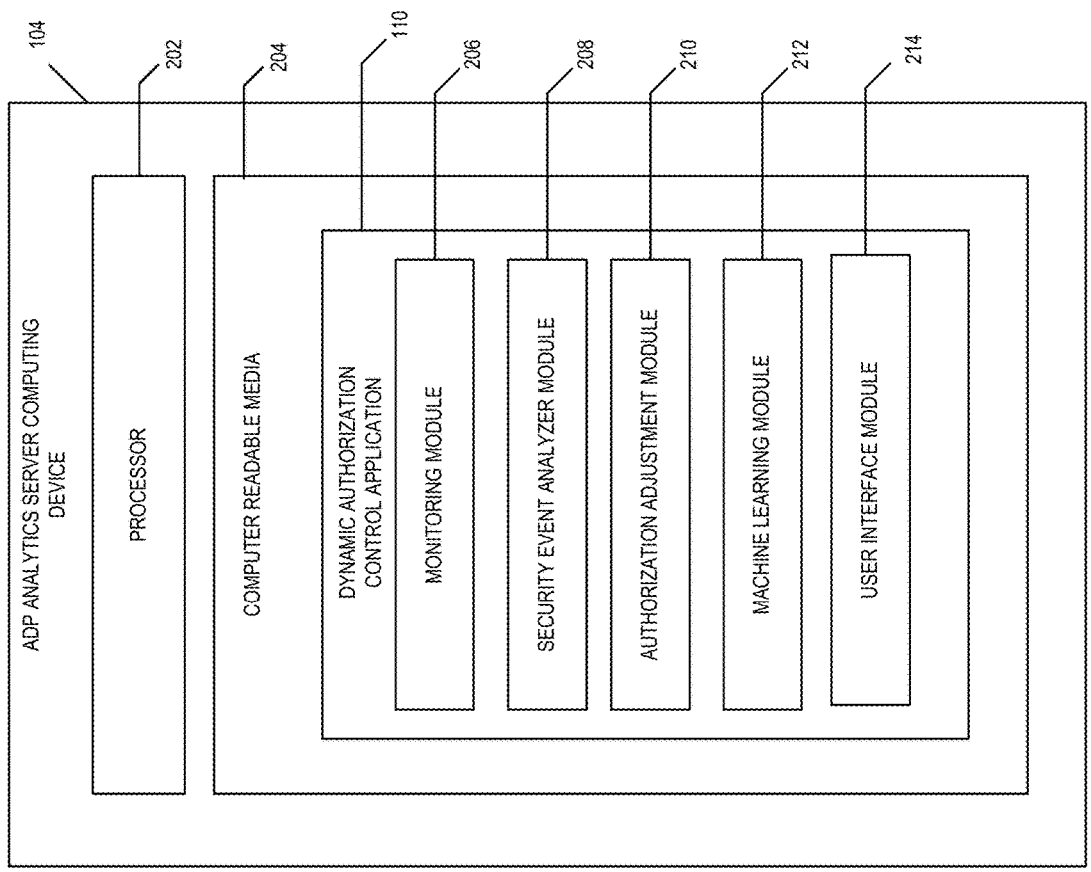
FIG. 2 illustrates a block diagram of a server computing device of the system according to an example embodiment.

FIG. 2 illustrates a block diagram of the ADP analytics server computing device 104 according to an example embodiment. The ADP analytics server computing device 104 may be a computer having a processor 202 and memory, such as a laptop, desktop, tablet computer, mobile computing device (e.g., a smartphone), or a dedicated electronic device having a processor and memory. The one or more processors 202 process machine/computer-readable executable instructions and data, and the memory stores machine/computer-readable executable instructions and data including one or more applications, including a server component of the dynamic authorization control application 110. The processor 202 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The ADP analytics server computing device 104 uses the dynamic authorization control application 110 to transmit data and messages and receive messages, data, and/or resources from the one or more client computing devices 102.

In order to obtain access to protected resources associated with the ADP analytics server computing device 104, e.g., resources stored in the storage of the ADP accelerator server computing device 106, the client computing device 102 optionally may transmit a request or other communication, such as with a representation of a username and a password, to the ADP analytics server computing device 104 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The ADP analytics server computing device 104 optionally verifies the username and password and transmits a response or other communication to the client computing device 102 or otherwise grants access to the client computing device to create and view data. The ADP analytics server computing device 104 may transmit an HTTP response, an HTTPS response, a LDAP response, a REST response, a SOAP response, and/or another type of response.

The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the ADP analytics server computing device 104 without directly sending the username and password to the ADP analytics server computing device 104 via the communications network 108.

The ADP analytics server computing device 104 includes computer readable media (CRM) 204 in memory on which the dynamic authorization control application 110 or other user interface or application is stored. The computer readable media may include volatile media, nonvolatile media, removable media, non-removable media, and/or another available medium that can be accessed by the processor 202. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The dynamic authorization control application 110 includes the following modules. The modules may include sub-modules that may be associated with the ADP accelerator server computing device 106 and thus portions of the dynamic authorization control application 110 may be executed by the ADP accelerator server computing device 106.

The dynamic authorization control application 110 may include a monitoring module 206 for monitoring active, funded business projects and authorization activity that may be associated with the active, funded business projects. As an example, a user may submit a file access request using a particular username and a password. The monitoring module 206 may determine whether the user having a particular role is active and part of an active, funded business project that may access the file associated with the file access request.

As another example, the monitoring module 206 may query business projects and business security policies. A user may submit a file access request using a particular username and a password. The monitoring module 206 may determine whether the user having a particular role should have access to the file and/or if privileges should be adjusted based on business projects and teams.

As another example, the monitoring module may query learning management systems for skills assessments. As an example, a user may have recently completed a skills assessment to learn about a particular skill and may have scored a score that is above a particular threshold on a quiz associated with that skill. The monitoring module 206 may automatically adjust privileges associated with the user and increase the privileges to include additional privileges. As an example, the user may now be granted database administrator privileges.

The dynamic authorization control application 110 may include a security event analyzer module 208 for monitoring security alert levels and other system monitors to analyze if privileges should be adjusted or modified based on the security alert level and/or the other system monitors. As an example, the security event analyzer module 208 may receive a notification that indicates that the security alert level for the system 100 and its associated network, cloud computing system, and other computing systems and environments has increased from a first level to a second level. The security event analyzer module 208 may automatically adjust privileges associated with a subset of roles or users associated with the system 100 based on the change in the security alert level from the first level to the second level. As an example, the privileges may be reduced for the subset of the roles or users if the second level is a higher level than the first level. Alternatively, the privileges may be increased for the subset of the roles or users if the second level is a higher level than the first level. Alternatively, the privileges may be increased for the subset of the roles or users if the second level is a lower level than the first level. Even further, the privileges may be decreased for the subset of the roles or users if the second level is a lower level than the first level. Other alternatives are possible.

The dynamic authorization control application 110 may include an authorization adjustment module 210 for receiving a message or notification from the monitoring module 206 and/or the security event analyzer module 208 that indicates that a subset of roles or users should have a modification or adjustment in their privileges. The authorization adjustment module 210 may receive the message and store an adjustment to privileges of the subset of roles or users to storage in the ADP analytics server computing device 104 and/or the ADP accelerator server computing device 106 based on the message. As an example, the authorization adjustment module 210 may store a change for a user A that demotes user A's privileges from a second level to a first level. The change may have a specific duration, e.g., a length of a project or until a security event level changes and drops below a particular threshold. As another example, the duration may be a period of time, e.g., one week. At that point, the authorization adjustment module 210 may automatically readjust user A's privileges back to normal, e.g., back to the second level. Optionally, the authorization adjustment module 210 may adjust privileges using authentication control schemes such as MICROSOFT ACTIVE DIRECTORY and Lightweight Directory Access Protocol (LDAP).

The dynamic authorization control application 110 may include a machine learning module 212 that allows the dynamic authorization control application 110 to learn rules to apply based on inputs and observations of the computing environment. As an example, the machine learning module 212 may receive training data such as a month of metadata associated with file access requests for the system 100. The metadata may indicate that users associated with a particular team assigned to update a software application associated with the system 100 do not have appropriate permissions, (e.g., by repeated security events indicating authentication request failures for users associated with the particular team). The metadata may indicate that the users are unable to access files that may be needed to update the software application. In the future, this same team may be assigned to update a different software application associated with the system 100. This team may be granted a higher level of privileges by the machine learning module 212 based on the past issues, e.g., each user may be granted a second level of privilege instead of an assigned first level of privilege.

In another embodiment, if security events (represented, for example, by login audit log entries) occur during project duration periods indicating insufficient permissions for users associated with the particular project team to access certain systems, storage, networks, cloud services, or operations, the machine learning module 212 may, in the future, increase privilege levels for such users associated with the particular project team. For example, each user may be granted a second level of privilege instead of an assigned first level of privilege. Similarly, if security events occur during project duration periods indicating higher permissions than were necessary to access certain systems, storage, networks, cloud services, or operations were issued for users associated with the particular project team, the machine learning module 212 may, in the future, decrease privilege levels for such users associated with the particular project team. For example, each user may be granted a first level of privilege instead of a previously assigned second level of privilege.

As a further example, the machine learning module 212 may be presented with training data regarding the entire lifecycle of each business project that may include one or more of types of security events that occur during projects, a number of security events that occur during projects, project durations, users or entities that caused past security events, normal permission access activity for various users, computing environment security alert levels, business defined security policies, system security audit logs, security event system logs, application logs, ransomware and cyberattack monitors, data protection activities (e.g., dramatic drops in deduplication ratios or unusual increases in backup traffic may indicate a ransomware attack), network traffic, electrical, heat, or other types of monitor feedback, vacation or travel schedules obtained from project management systems, and other types of training data. Using this training data, the machine learning module 212 may develop a rule that allows the machine learning module 212 and the authorization adjustment module 210 to apply a rule.

As an example, the machine learning module 212 may suggest and/or automatically adjust a duration of a privilege adjustment based on past project lengths. The machine learning module 212 may be presented with training data regarding the entire lifecycle of each business project. The machine learning module 212 may analyze the entire lifecycle of each business project that has associated project team authentication requests for access to any applications, data, operations, or computing resources. Further, for each business project the machine learning module 212 may analyze business project training data for repeated security events indicating authentication request failures for users associated with the particular project team. If a certain percentage of those security events occurs following project duration periods, the machine learning module 212 may, in the future, extend authentication adjustment durations beyond future project duration periods. This extension may continue until security events decrease on future projects. If, upon further analysis and observance of business projects, security events associated with particular project teams decrease, the machine learning module 212 may shorten authentication adjustment durations. As a result, the machine learning module 212 may continually adjust the duration of a privilege adjustment based on previous project activities and their associated security events.

In a further example, the machine learning module 212 may, over time, adjust project duration periods of a privilege adjustment as well as project permission levels to optimal settings based on continual experiences and behaviors in the environment.

The system 100 may continually monitor for indications of a security event such as a ransomware or other cyberattack, heightened environment security alert levels, personnel layoffs, or other conditions or events. Upon indications of a ransomware or other cyber-attack, heightened environment security alert levels, personnel layoffs, or other conditions or events, the system 100 may demote certain authorization levels across the system 100 and its associated network, cloud computing system, and other computing systems and environments to limit access in times of heightened threat.

In another example, the machine learning module 212 may be presented with training data that may include one or more types of computing environment security alert levels, business defined security policies, system security audit logs, security event system logs, application logs, ransomware and cyber-attack monitors, data protection activities (e.g., dramatic drops in deduplication ratios or unusual increases in backup traffic may indicate a ransomware attack), and other types of training data. Using this training data, the machine learning module 212 may, through analysis of the training data, assess the effectiveness of previous demotions of certain authorization levels performed by system 100 upon indications of a ransomware or other cyber-attack, heightened environment security alert levels, personnel layoffs, or other conditions or events. For example, the machine learning module 212 may determine if previous demotions of certain authorization levels effectively limited the scope of a ransomware or other cyber-attack by assessing the extent of damage that occurred after the demotions of certain authorization levels. If the machine learning module 212 determines that previous demotions of certain authorization levels were appropriate (e.g., previous demotions limited the spread of a ransomware or other cyber-attack), authorization adjustment rules may remain the same. If the machine learning module 212 determines that previous demotions of certain authorization levels were not effective (e.g., a ransomware or other cyber-attack continued to spread after demotions of certain authorization levels) the machine learning module 212 may change authorization adjustment rules to be enforced during future security events. In one such example, the machine learning module 212 may further demote certain authorization levels. In another example, the machine learning module 212 may broaden the scope of certain authorization level demotions. In yet another example, the machine learning module 212 may restrict external network traffic in order to limit access to enterprise data and resources.

As another example, the machine learning module 212 may suggest and/or automatically adjust a user's privileges when the user is on vacation or travelling because the user may be accessing the network from less secure locations. In this case the machine learning module 212 may require additional authentication such as two factor authentication. As another example, the machine learning module 212 may suggest and/or automatically adjust a user's privileges after the user has submitted their notice that they will be leaving the company. In a further example, the machine learning module 212 may, over time, adjust authorization adjustment rules to optimal settings based on continual experiences and behaviors in the environment. The machine learning module 212 may modify a duration of a user authorization control during one of a ransomware attack, a fire, and a change in a security alert level responsive to the machine learning rule. The machine learning module 212 also may modify a level of the at least one user authorization control during one of a ransomware attack, a fire, and a change in a security alert level responsive to the machine learning rule. As another example, the machine learning module 212 may modify a level of the at least one user authorization control during the active project responsive to the machine learning rule based on a previous level or may modify a duration of the at least one user authorization control during the active project responsive to the machine learning rule based on a previous duration. In another example, the machine learning module 212 may determine that a number of events decrease over a period of time and shorten a duration of the at least one user authorization control responsive to the machine learning rule or may determine that a number of events increase over a period of time and increase a duration of the at least one user authorization control responsive to the machine learning rule.

One area of focus in existing machine learning solutions is on real-time use cases including technologies required to support these such as real-time data pipelines and high-speed databases. While responsiveness is important for implementing analytics for enterprise data protection operations, real-time machine learning such as that which may be required for financial transaction analysis or other real-time use cases may not be as critical for machine learning for enterprise data protection operations. Near real-time or recent-time machine learning may suffice for enterprise data protection operations. Indeed, the knowledge obtained from machine learning for data protection operations may be derived in large part from analysis of events and behaviors over time. This may provide additional flexibility for possible embodiments of the disclosed machine learning techniques.

The dynamic authorization control application 110 includes a user interface module 214. The user interface module 214 receives requests or other communications from the client computing devices 102 and transmits a representation of requested information, user interface elements, and other data and communications to the client computing device 102 for display. As an example, the user interface module 214 generates a native and/or web-based graphical user interface (GUI) that accepts input and provides output by generating content that is transmitted via the communications network 108 and viewed by a user of the client computing device 102. The GUI may be the ADP Commander discussed herein. The user interface module 214 may provide realtime, automatically and dynamically refreshed information to the user of the client computing device 102 using Java, Javascript, AJAX (Asynchronous Javascript and XML), ASP.NET, Microsoft.NET, and/or node.js, among others. The user interface module 214 may send data to other modules of the dynamic authorization control application 110 of the ADP analytics server computing device 104, and retrieve data from other modules of the dynamic authorization control application 110 of the ADP analytics server computing device 104 asynchronously without interfering with the display and behavior of the dynamic authorization control application 110 displayed by the client computing device 102. As an example, data may be retrieved using XMLHttpRequest objects or using Web-Sockets.

Figure 3:
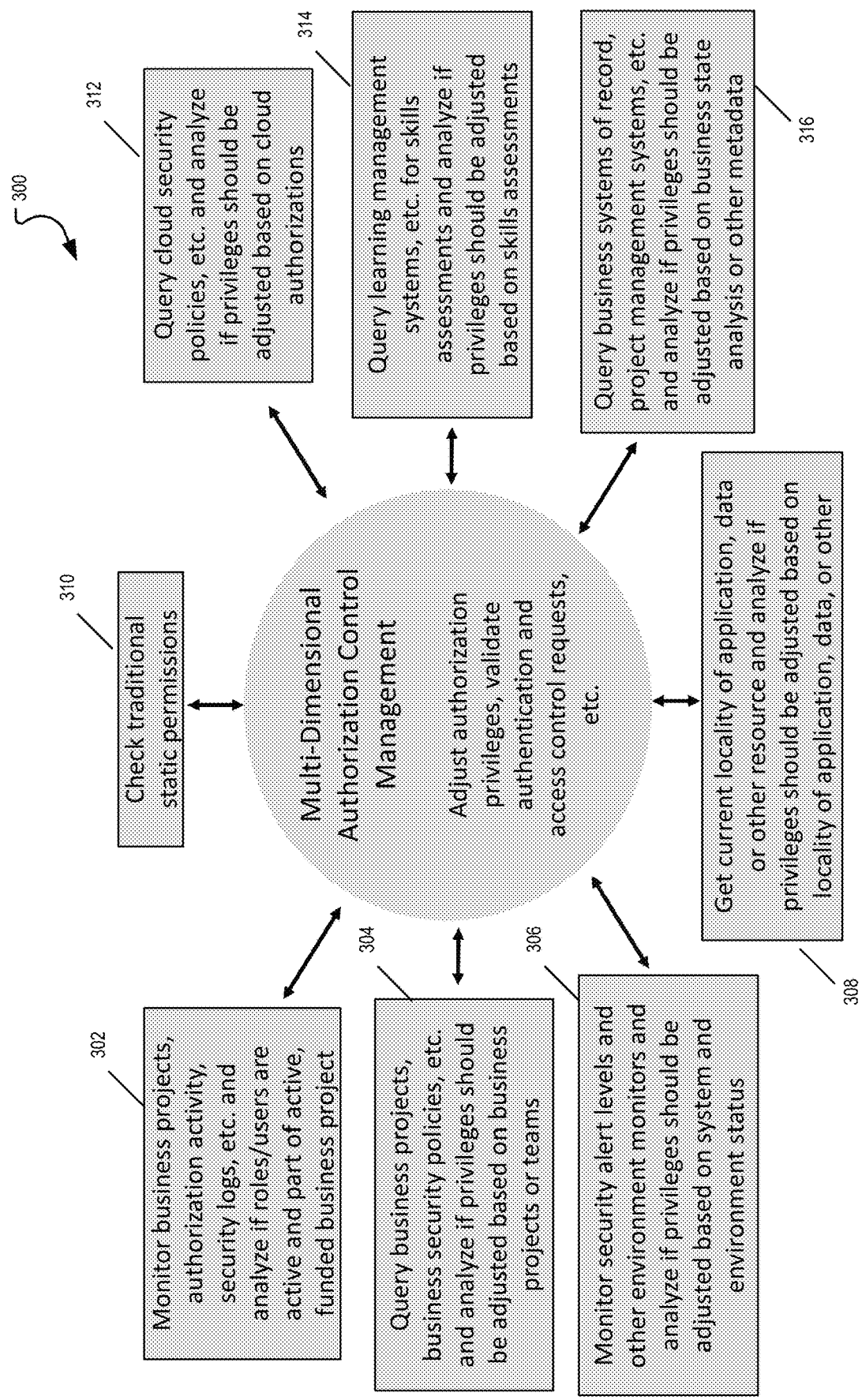
FIG. 3 illustrates a hub and spoke flowchart for dynamically modifying authorization control according to an example embodiment.

FIG. 3 illustrates a hub and spoke flowchart showing a process 300 that shows how the dynamic authorization control system 100 performs multi-dimensional authorization control management. The system 100 uses the dynamic authorization control application 110 to perform process 300 to adjust authorization privileges, validate authentication and access control requests, and other functions as shown in FIG. 3.

As shown in 302, the dynamic authorization control application 110 may monitor business projects, authorization activity, security logs, and other logs to analyze if roles/users are active and part of active, funded business projects. In 304, the dynamic authorization control application 110 may further query business projects and business security policies to analyze if privileges should be adjusted or modified based on business projects or teams. Additionally, in 306, the dynamic authorization control application 110 may monitor security alert levels and other computing environment monitors and analyze if privileges should be adjusted based on system and environment status. Even further, in 308, the dynamic authorization control application 110 may obtain a current locality of an application, data, or other computing resource associated with the system 100 to analyze if privileges should be adjusted based on the locality of the application, data, or other computing resource.

In 310, the dynamic authorization control application 110 may check traditional static permissions. In addition, in 312, the dynamic authorization control application 110 may query cloud security policies and analyze if privileges should be adjusted based on cloud authorizations. In 314, the dynamic authorization control application 110 also may query learning management systems for skills assessments and analyze if privileges should be adjusted based on skills assessments. In addition, in 316, the dynamic authorization control application 110 may query business systems of record and project management systems to analyze if privileges should be adjusted based on business state analysis or other metadata.

Figure 4:
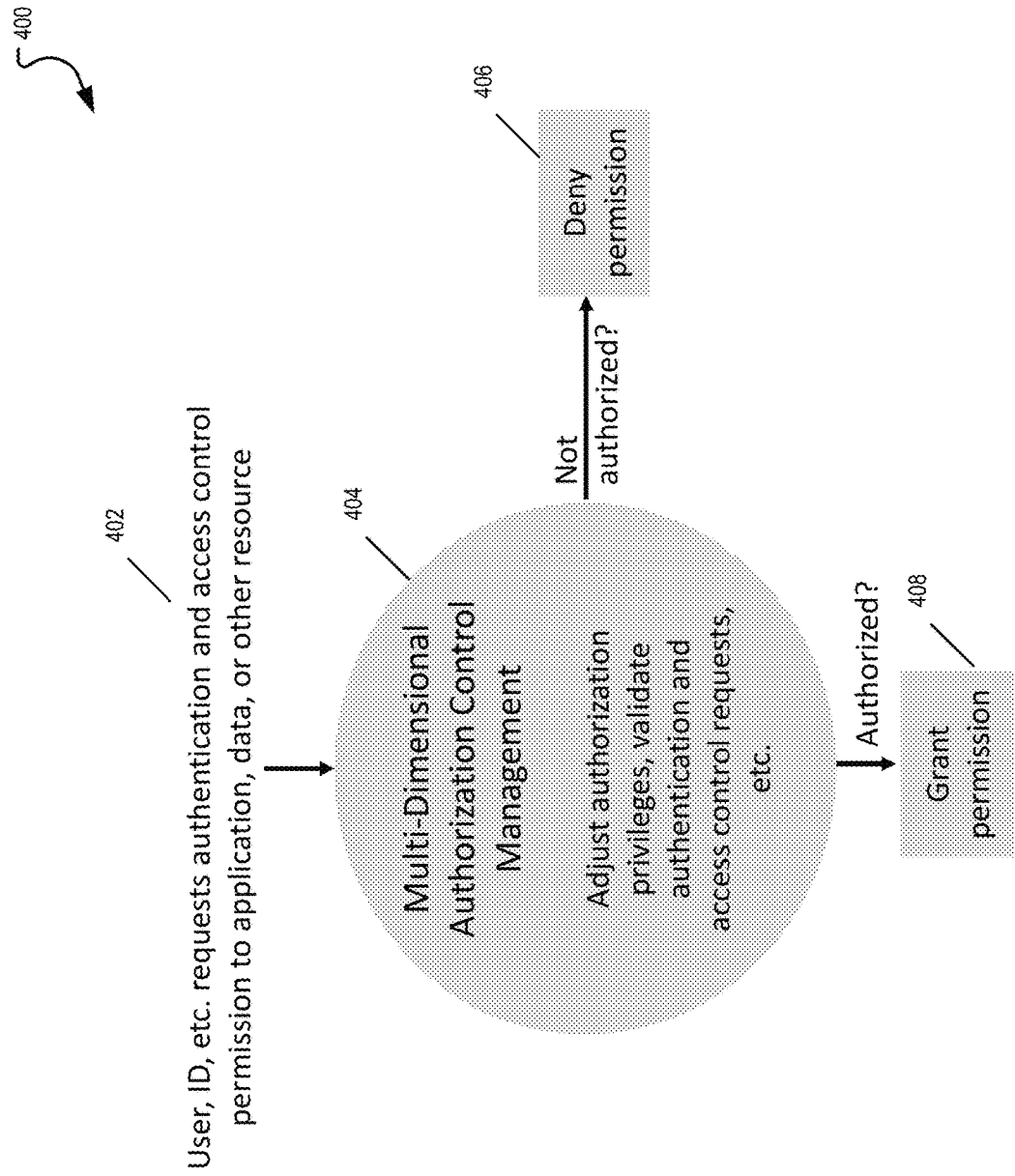
FIG. 4 illustrates a flowchart for determining whether a user of the system is authorized according to an example embodiment.

FIG. 4 illustrates a flowchart for determining whether a user of the system is authorized according to an example embodiment. As shown in FIG. 4, in 402, a user having an ID may request authentication and access control permission to an application, data, or other resource associated with the system 100. Then, in 404, the dynamic authorization control application 110 may perform multi-dimensional authorization control management as discussed herein and as shown in FIG. 3. The dynamic authorization control application 110 may adjust authorization privileges and validate authentication (e.g., a username and password) and access control requests. In 406, the dynamic authorization control application 110 may determine that the user having the ID is not authorized and may deny permission. Alternatively, in 408, the dynamic authorization control application 110 may determine that the user having the ID is authorized and may grant permission.

Figure 5:
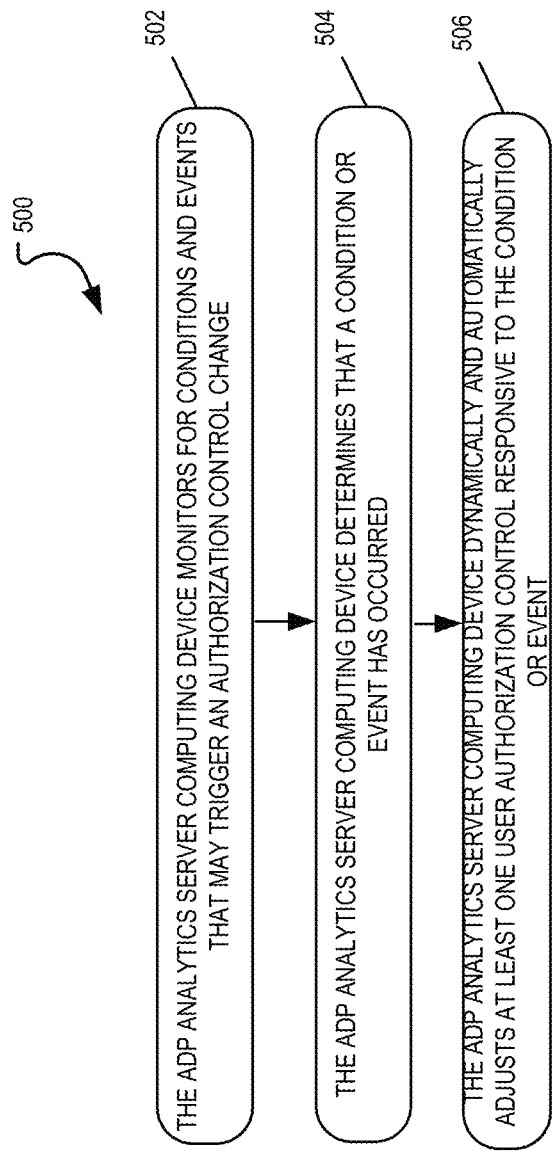
FIG. 5 illustrates a flowchart for dynamically modifying authorization control according to an example embodiment.

FIG. 5 illustrates a flowchart of a process for dynamically modifying authorization control according to an example embodiment. In a first step 502, the ADP analytics server computing device 104 may monitor for conditions and events that may trigger an authorization control change. This may occur in response to a request from one or more users. As an example, the request may be a request for authentication and access control permission to an application, data, or another computing resource. Alternatively, the ADP analytics server computing device 104 may continually monitor for conditions and events that may trigger the authorization control change. The condition or event may be a number of things as discussed herein such as authorization activity found in audit logs, security logs, a period of time since a last access, a creation of a known business project or team, a change in a security alert level, a change in a locality of an application, data, or another resource, a creation of a cloud security policy or a change in the cloud security policy, a skills assessment result, a project management system log, a receipt of another type of metadata, or another condition or event as discussed herein.

Next, in step 504, the ADP analytics server computing device 104 may determine that one of the events or conditions has occurred. In step 506, the ADP analytics server computing device 104 may dynamically and/or automatically adjust at least one user authorization control responsive to the condition or the event. As an example, the authorization adjustment module 210 may receive a message or notification from the monitoring module 206 and/or the security event analyzer module 208 that indicates that a subset of roles or users should have a modification or adjustment in their privileges. The authorization adjustment module 210 may receive the message and store an adjustment to privileges of the subset of roles or users to storage in the ADP analytics server computing device 104 and/or the ADP accelerator server computing device 106 based on the message. As an example, the authorization adjustment module 210 may store a change for a user A that demotes user A's privileges from a second level to a first level. The change may have a specific duration, e.g., a length of a project or until a security event level changes and drops below a particular threshold. At that point, the authorization adjustment module 210 may automatically readjust user A's privileges back to normal, e.g., back to the second level.

Figure 6:
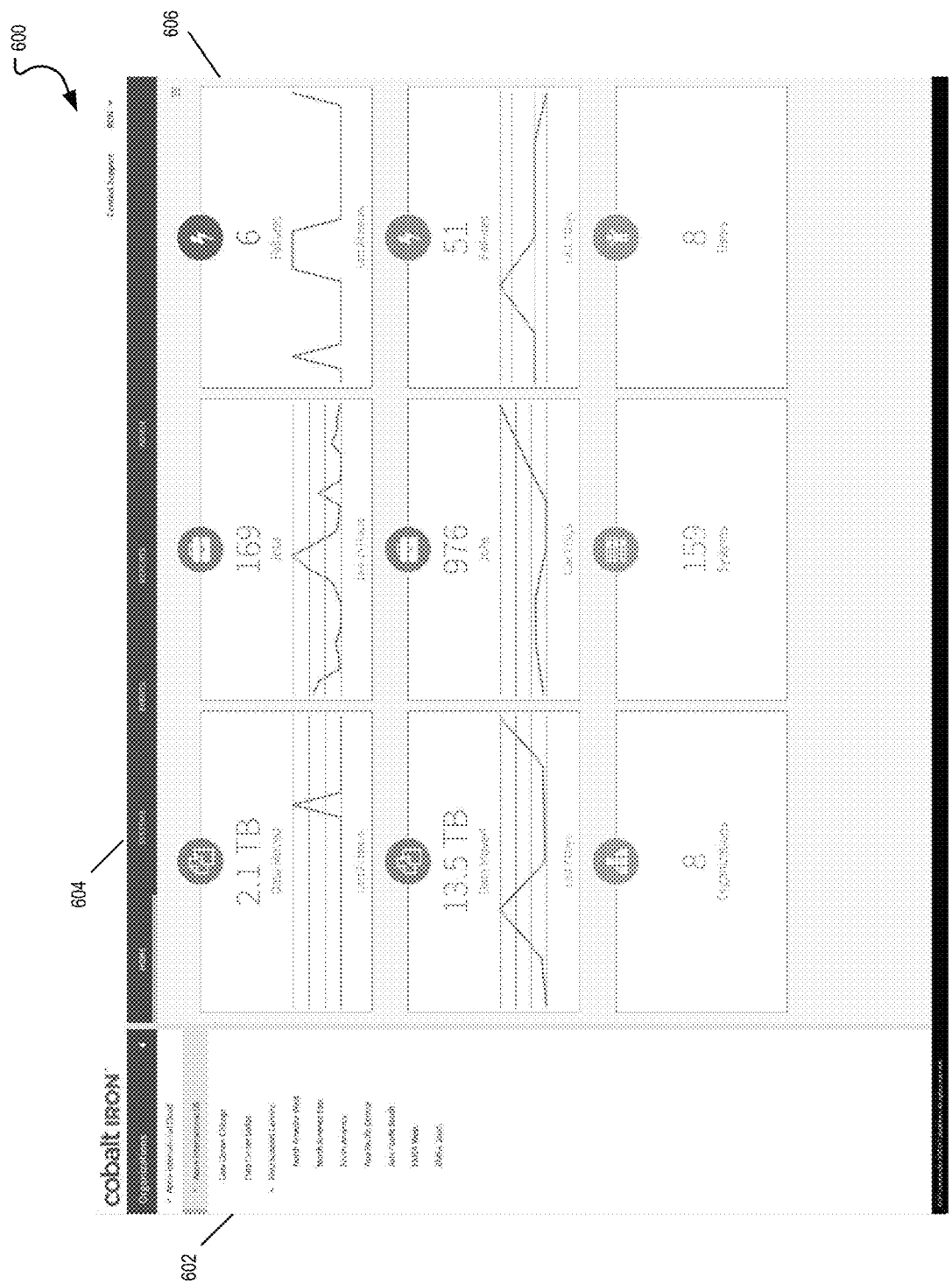
FIG. 6 illustrates an example screenshot of a user interface of an application of the dynamic authorization control system according to an example embodiment.

FIG. 6 illustrates an example screenshot 600 of the user interface, e.g., the ADP Commander, provided by the dynamic authorization control application 110 according to an example embodiment. As shown in FIG. 6, the screenshot 600 shows a plurality of user interface elements including a first user interface section 602 on the left side of the user interface, a second user interface section 604 on the top of the user interface, and a third user interface section 606 in a middle of the user interface. The first user interface section 602 includes a list of organizations including Acme International Cloud that includes Data Center Chicago, Data Center Dallas and Field Support Centers including North America West, North America East, South America, Asia Pacific Central, Asia Pacific South, EMEA West, and EMEA South. The second user interface section 604 may be a tab bar including selectable user interface elements such as Home, Systems, Events, Reports, and Admin. As shown in FIG. 6, Home is the currently selected bar user interface element. The third user interface section 606 includes showing data and information associated with data moved in the last twenty-four hours (e.g., 2.1 terabytes), a number of jobs in the last twenty-four hours (e.g., 169), failures in the last twenty-four hours (e.g., six), data moved in the last seven days (e.g., 13.5 terabytes), jobs in the last seven days (e.g., 976), failures in the last seven days (e.g., fifty-one), a number of organizations (e.g., eight), a number of systems (e.g., one hundred and fifty-nine), and a number of users (e.g., eight). In addition, some of the data and information may be presented using a graph that shows activity over the particular time period. Other options are possible.

Figure 7:
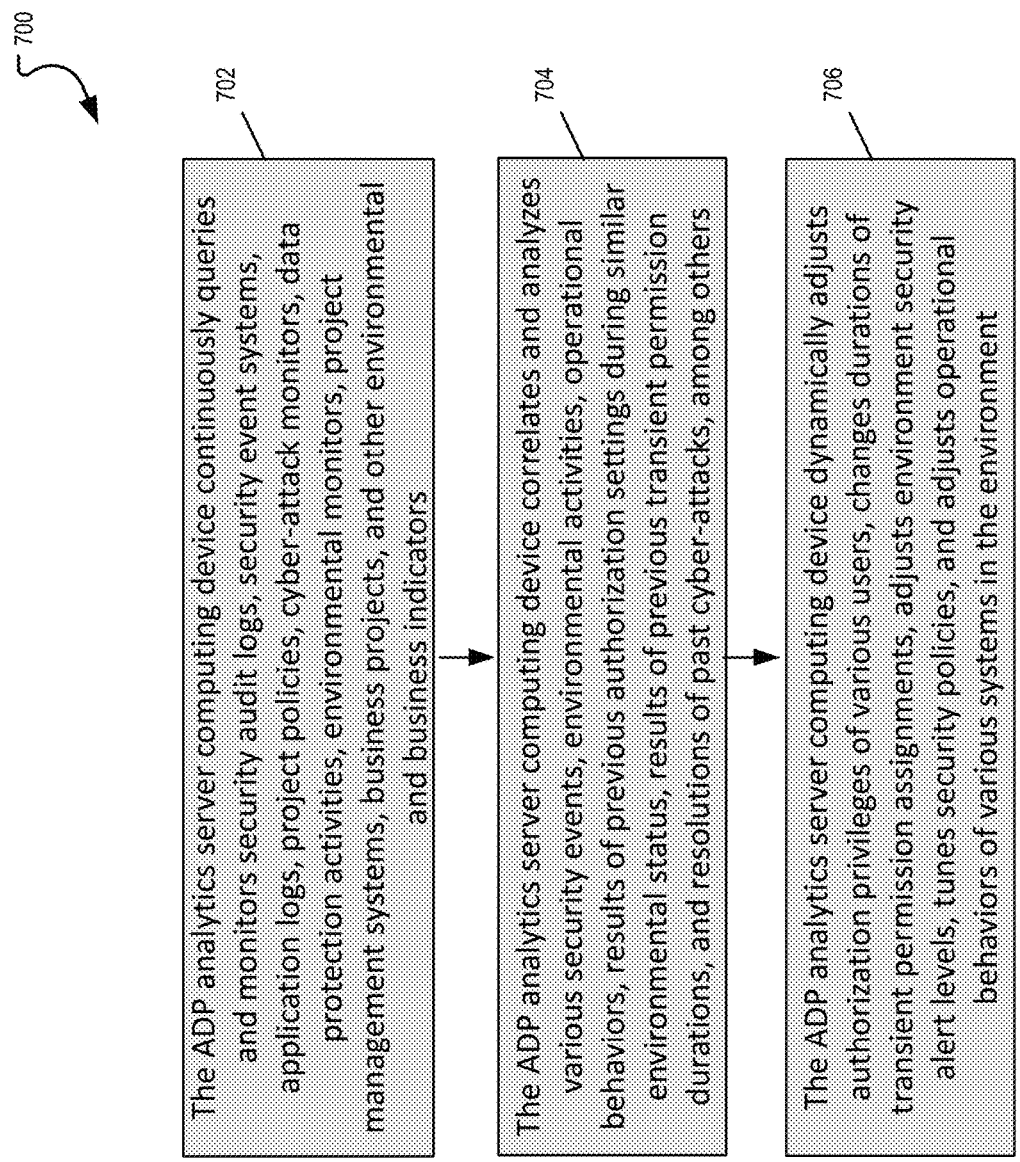
FIG. 7 illustrates a flowchart for analyzing and dynamically modifying authorization control using machine learning according to an example embodiment.

FIG. 7 illustrates a flowchart of a process 700 for analyzing and dynamically modifying authorization control using machine learning according to an example embodiment. The process determines whether authorization privileges are to be dynamically modified and/or adapted. In a first step 702, the ADP analytics server computing device 104 may continuously query and monitor security audit logs, security event systems, application logs, project policies, cyber-attack monitors, data protection activities, environmental monitors, project management systems, business projects, and other environmental and business indicators.

Next, in step 704, the ADP analytics server computing device 104 may correlate and analyze various security events, environmental activities, operational behaviors, results of previous authorization settings during similar environmental status, results of previous transient permission durations, and resolutions of past cyber-attacks, among others.

In step 706, the ADP analytics server computing device 104 may dynamically adjust authorization privileges of various users, change durations of transient permission assignments, adjust environment security alert levels, tune security policies, adjust operational behaviors of various systems in the environment, or take other actions.

The ADP analytics server computing device 104 may continually analyze training data from previous ransomware or other cyber-attacks. The ADP analytics server computing device 104 may assess the effectiveness of previous demotions of certain authorization levels, scopes of previous authorization level demotions, or network traffic restrictions made upon indication of ransomware or other cyber-attack. If previous demotions of certain authorization levels, scopes of previous authorization level demotions, or network traffic restrictions successfully limited the spread of previous ransomware or other cyber-attacks, then authorization adjustments may be maintained. However, if previous demotions of certain authorization levels, scopes of previous authorization level demotions, or network traffic restrictions did not limit the spread of previous ransomware or other cyber-attacks, then authorization control rules may be adjusted for future ransomware or other security events. This may include demoting certain authorization levels, broadening the scope of certain authorization level demotions, or further restricting external network traffic.

Figure 8:
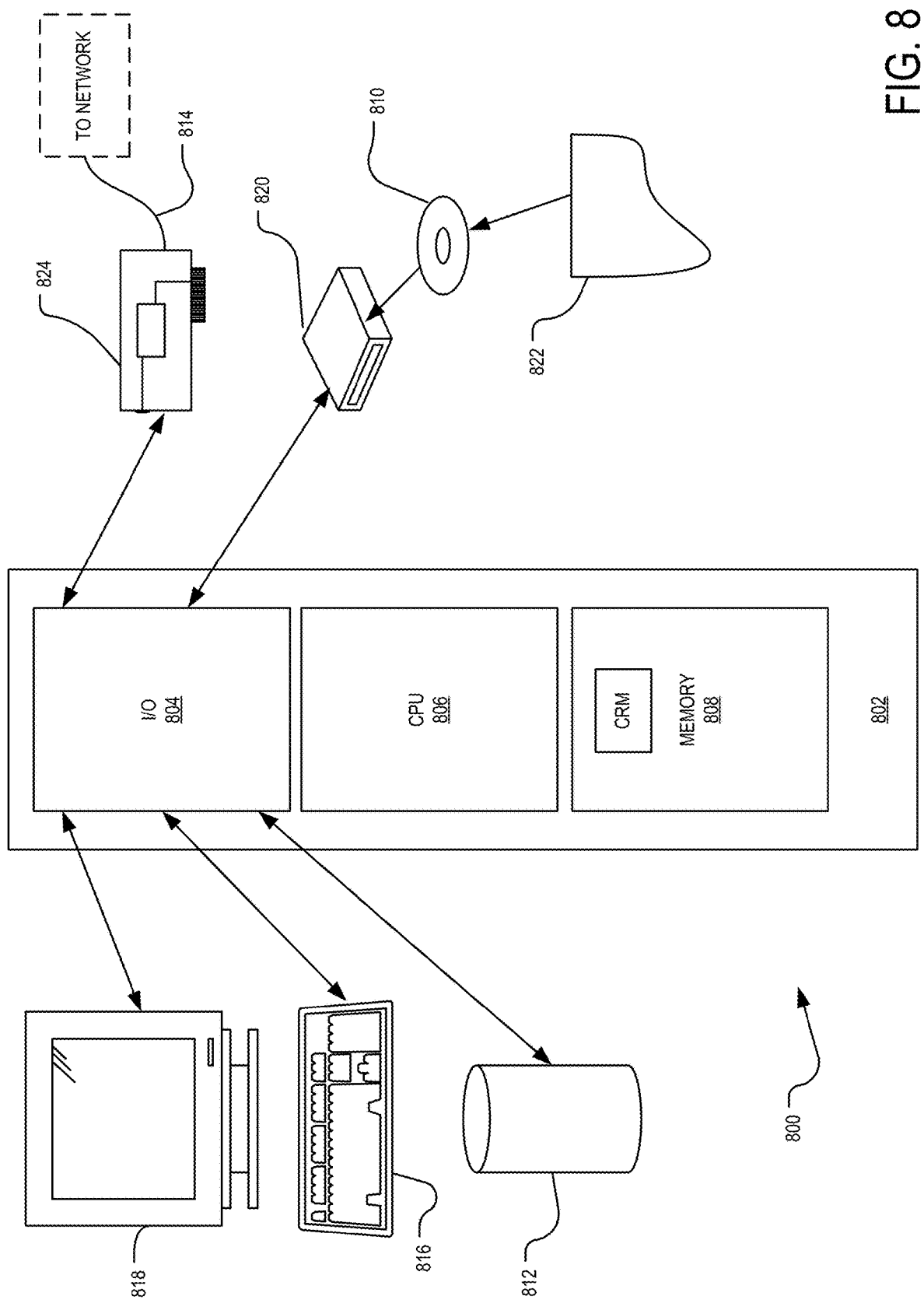
FIG. 8 illustrates a block diagram of an example computer device for use with the example embodiments.

FIG. 8 illustrates an example computing system 800 that may implement various systems, such as the client computing device 102, the ADP analytics server computing device 104, the ADP accelerator server computing device 106, and the methods discussed herein, such as process 300, process 400, process 500, and process 700. A general purpose computer system 800 is capable of executing a computer program product to execute a computer process. Data and program files may be input to the computer system 800, which reads the files and executes the programs therein such as the dynamic authorization control application 110. Some of the elements of a general purpose computer system 800 are shown in FIG. 8 wherein a processor 802 is shown having an input/output (I/O) section 804, a central processing unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a server, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The memory section 808 may be volatile media, nonvolatile media, removable media, non-removable media, and/or other media or mediums that can be accessed by a general purpose or special purpose computing device. For example, the memory section 808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 804 is connected to one or more user-interface devices (e.g., a keyboard 816 and a display unit 818), a disc storage unit 812, and a disc drive unit 820. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 804, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by a floppy drive unit, a tape drive unit, or other storage medium drive unit. The network adapter 824 is capable of connecting the computer system 800 to a network via the network link 814, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection and/or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, source code executed by the client computing device 102, the ADP analytics server computing device 104, the ADP accelerator server computing device 106, a plurality of internal and external databases, source databases, and/or cached data on servers are stored in the storage of ADP accelerator, memory of the client computing device 102, memory of the ADP analytics server computing device 104, memory of ADP accelerator server computing device 106, or other storage systems, such as the disk storage unit 812 or the DVD/CD-ROM medium 810, and/or other external storage devices made available and accessible via a network architecture. The source code executed by the client computing device 102, the ADP analytics server computing device 104, and the ADP accelerator server computing device 106 may be embodied by instructions stored on such storage systems and executed by the processor 802.

Some or all of the operations described herein may be performed by the processor 802, which is hardware. Further, local computing systems, remote data sources and/or services, and other associated logic represent firmware, hardware, and/or software configured to control operations of the dynamic authorization control system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a network adapter to communicate with a computing network;
   a non-transitory computer-readable medium; and
   at least one processor to execute instructions stored in the non-transitory computer-readable medium to:
      continually monitor at least one resource associated with the computing network for a condition in the computing network that may trigger an authorization control modification, the condition comprising a state of a project that uses the at least one resource, wherein the state of the project comprises an operational state within a project lifecycle, and wherein the operational state is selected from the group consisting of design, prototype, validation, pre-production, production, steady-state, sunset, and decommissioned;
      determine that the condition has occurred in the computing network;
      dynamically and automatically modify at least one user authorization control for at least one particular user responsive to a change in the state of the project; and
      receive an authentication and access control request from a user of a client computing device and determine if the user of the client computing device is authorized to access the at least one resource based on the at least one user authorization control modified in response to the change in the state of the project.

2. The system of claim 1, the at least one processor further to modify a duration of the at least one user authorization control responsive to the condition.

3. The system of claim 1, the at least one processor further to modify a level of the at least one user authorization control responsive to the condition.

4. The system of claim 1, the at least one processor further to increase or decrease a level of the at least one user authorization control responsive to the condition.

5. The system of claim 1, wherein the state of the project includes whether the project is active or funded.

6. The system of claim 1, further comprising a machine-learning component to determine the state of the project.

7. The system of claim 1, the at least one processor further to receive an authentication and access control request from a user of a client computing device and determine if the user of the client computing device is authorized to access a computing resource based on the user authorization control and based on a cloud security profile that designates cloud authentication and access control for the computing resource that is associated with a particular cloud computing provider.

8. The system of claim 1, wherein the instructions are further to:
   continually monitor, by at least one processor, at least one resource associated with a computing network for a further condition in the computing network that may trigger an authorization control modification, the further condition comprising a security alert level change;

determine, by the at least one processor, that the further condition has occurred in the computing network; and dynamically and automatically modify, by the at least one processor, at least one user authorization control for at least one particular user responsive to the security alert level change.

9. The system of claim 8, wherein the instructions are further to modify a duration of the at least one user authorization control responsive to the further condition.

10. The system of claim 8, wherein the instructions are further to modify a level of the at least one user authorization control responsive to the further condition.

11. The system of claim 8, wherein the instructions are further to increase or decrease a level of the at least one user authorization control responsive to the further condition.

12. The system of claim 8, wherein the security alert level change is in response to a cyber threat.

13. The system of claim 8, wherein the security alert level change is in response to a health status of a computing device.

14. The system of claim 13, wherein the health status indicates a failure or pending failure of the computing device.

15. The system of claim 8, wherein the security alert level change is in response to an environmental event.

16. The system of claim 8, wherein the instructions are further to use machine-learning analytics to determine the security alert level change.

17. The system of claim 1, wherein the instructions are further to:

continually monitor at least one resource associated with a computing network for a further condition in the computing network that may trigger an authorization control modification, the further condition comprising a change in a locality of the at least one resource or of an application that accesses the at least one resource;

determine that the further condition has occurred in the computing network; and dynamically and automatically modify at least one user authorization control for at least one particular user responsive to the change in the locality of the at least one resource or the application that accesses the at least one resource.

18. The system of claim 17, wherein the instructions are further to modify a duration of the at least one user authorization control responsive to the condition.

19. The system of claim 17, wherein the instructions are further to modify a level of the at least one user authorization control responsive to the condition.

20. The system of claim 17, wherein the instructions are further to increase or decrease a level of the at least one user authorization control responsive to the condition.

21. The system of claim 17, wherein the locality of the application comprises a physical location of hardware that executes the application.

22. The system of claim 17, wherein the locality of the application comprises a physical location at which instructions for the application are stored.

23. The system of claim 17, wherein the locality of the at least one resource comprises a physical location of the at least one resource.

24. The system of claim 17, wherein determining that the condition has occurred in the computing network comprises obtaining a current locality of the at least one resource or the application that accesses the at least one resource.

* * * * *